US007809547B2

(12) United States Patent
Guenthner et al.

(10) Patent No.: US 7,809,547 B2
(45) Date of Patent: Oct. 5, 2010

(54) HOST COMPUTER SYSTEM EMULATING TARGET SYSTEM LEGACY SOFTWARE AND PROVIDING FOR INCORPORATING MORE POWERFUL APPLICATION PROGRAM ELEMENTS INTO THE FLOW OF THE LEGACY SOFTWARE

(76) Inventors: Russell W. Guenthner, 6403 W. Redfield Rd., Glendale, AZ (US) 85306; David W. Selway, 6542 N. 17th Ave., #15, Phoenix, AZ (US) 85015; Stefan R. Bohult, 15428 N. 10th Ave., Phoenix, AZ (US) 85023; Clinton B. Eckard, R.R. 2, Box 414B, McMinnville, TN (US) 37110

( * ) Notice: Subject to any disclaimer, the term of this patent is extended or adjusted under 35 U.S.C. 154(b) by 1190 days.

(21) Appl. No.: 11/324,052

(22) Filed: Dec. 29, 2005

(65) Prior Publication Data

US 2007/0156391 A1 Jul. 5, 2007

(51) Int. Cl.
*G06F 9/455* (2006.01)
*G06F 9/45* (2006.01)
*G06F 9/44* (2006.01)
*G06F 9/00* (2006.01)
*G06F 9/04* (2006.01)

(52) U.S. Cl. .................. 703/27; 703/26; 712/237; 717/140

(58) Field of Classification Search .......... 703/26, 703/27; 717/140; 712/237
See application file for complete search history.

(56) References Cited

U.S. PATENT DOCUMENTS 5,956,495 A * 9/1999 Kahle et al. ............... 703/26
6,075,938 A * 6/2000 Bugnion et al. ........... 703/27
6,173,248 B1 * 1/2001 Brauch ..................... 703/26
6,247,172 B1 * 6/2001 Dunn et al. ................ 717/141
6,339,752 B1 * 1/2002 Mann et al. ............... 703/26
6,356,997 B1 * 3/2002 Krishnan et al. .......... 712/237
6,415,436 B1 * 7/2002 Patel ........................ 717/140
6,519,605 B1 * 2/2003 Gilgen et al. .......... 707/103 R
2003/0037030 A1 * 2/2003 Dutta et al. ................ 707/1
2004/0221274 A1 * 11/2004 Bross et al. ............... 717/136
2007/0016895 A1 * 1/2007 Tan .......................... 717/136

OTHER PUBLICATIONS

T. Hoppin, "Strategies for Mitigating Risk Related to the Obsolescence of HP 8566/68 Spectrum Analyzers in ATE Systems", IEEE 2002, pp. 608-620.*

* cited by examiner

*Primary Examiner*—Kamini S Shah
*Assistant Examiner*—Suzanne Lo

(57) ABSTRACT

As manufacturers of very fast and powerful commodity processors continue to improve the capabilities of their products, it has become practical to emulate the proprietary hardware and operating systems of powerful older computers on platforms built using commodity processors such that the manufacturers of the older computers can provide new systems which allow their customers to continue to use their highly-regarded proprietary legacy software on state-of-the-art new computer systems by emulating the older computer in software that runs on the new systems. In an example of the subject invention, a 64-bit Cobol Virtual Machine instruction provides the capability of adding to or improving the performance of legacy 36-bit Cobol code. Legacy Cobol instructions can be selectively diverted, in the host CPU, to a 64 bit Virtual Machine Implementation. The output legacy and new Cobol code is compiled in a dedicated implementation of the Cobol compiler, and the output of the special purpose compiler is emulated in a special purpose software emulator, separate from the main software emulator that handles the normal 36-bit stream of legacy code.

21 Claims, 6 Drawing Sheets

HOST COMPUTER SYSTEM EMULATING TARGET SYSTEM LEGACY SOFTWARE AND PROVIDING FOR INCORPORATING MORE POWERFUL APPLICATION PROGRAM ELEMENTS INTO THE FLOW OF THE LEGACY SOFTWARE

FIELD OF THE INVENTION

This invention relates to the art of computer system emulation and, more particularly, to a host computer system in which the instruction set of legacy system hardware design is emulated by a software program to thus preserve legacy software. More particularly, this invention relates to a host system which further includes apparatus and software which permits more powerful legacy application program elements to be created and used in conjunction with the directly emulated legacy software.

BACKGROUND OF THE INVENTION

Users of obsolete mainframe computers running a proprietary operating system may have a very large investment in proprietary application software and, further, may be comfortable with using the application software because it has been developed and improved over a period of years, even decades, to achieve a very high degree of reliability and efficiency.

As manufacturers of very fast and powerful "commodity" processors continue to improve the capabilities of their products, it has become practical to emulate the proprietary hardware and operating systems of powerful older computers on platforms built using commodity processors such that the manufacturers of the older computers can provide new systems which allow their customers to continue to use their highly-regarded proprietary software on state-of-the-art new computer systems by emulating the older computer in software that runs on the new systems.

Accordingly, computer system manufacturers are developing such emulator systems for the users of their older systems, and the emulation process used by a given system manufacturer is itself subject to ongoing refinement and increases in efficiency and reliability.

Some historic computer systems now being emulated by software running on commodity processors have achieved performance which approximates or may even exceed that provided by legacy hardware system designs. An example of such hardware emulation is the Bull HN Information Systems (descended from General Electric Computer Department and Honeywell Information Systems) DPS 9000 system which is being emulated by a software package running on a Bull NovaScale system which is based upon an Intel Itanium 2 Central Processor Unit (CPU). The 64-bit Itanium processor is used to emulate the Bull DPS 9000 36-bit memory space and the GCOS 8 instruction set of the DPS 9000. Within the memory space of the emulator, the 36-bit word of the "target" DPS 9000 is stored right justified in the least significant 36 bits of the "host" (Itanium) 64-bit word. The upper 28 bits of the 64-bit word are typically zero for "legacy" code. Sometimes, certain specific bits in the upper 28 bits of the containing word are used as flags or for other temporary purposes, but in normal operation these bits are usually zero and in any case are always viewed by older programs in the "emulated" view of the world as being non-existent. That is, only the emulation program itself uses these bits.

In the development of the emulator system, careful attention is typically devoted to ensuring exact duplication of the legacy hardware behavior so that legacy application programs will run without change and even without recompilation. Exact duplication of legacy operation is highly desirable to accordingly achieve exactly equivalent results during execution.

In order to achieve performance in an emulated system that at least approximates that achieved by the legacy system hardware, or in more general terms, in order to maximize overall performance, it is necessary that the code that performs the emulation be very carefully designed and very "tightly" coded in order to minimize breaks and maximize performance. These considerations require careful attention to the actual lowest level design details of the host system hardware, that is, the hardware running the software that performs the emulation. It also requires employing as much parallelization of operations as possible.

An Intel Itanium series 64-bit CPU is an excellent platform for building a software emulator of a legacy instruction set because it offers hardware resources that enable a high degree of potential parallelism in the hardware pipeline of the Itanium CPU. The Itanium CPU also provides instructions that allow for fast decision making and guidance by the software as to the most likely path of program flow for a reduction in instruction fetch breaks and overall improved performance. In particular, the Itanium architecture provides instructions that allow preloading of a "branch register" which informs the hardware of the likely new path of the instructions to be executed, with the "branch" instruction itself actually happening later. This minimizes the CPU pipeline breaks that are characteristically caused by branch instructions, and allows for typically well predicted branch instructions to be processed efficiently without CPU pipeline breaks wasting cycles. The branch look-ahead hardware of the Itanium CPU, and in particular a specific mechanism for loading and then using a branch register, allows for the emulation software to achieve a higher degree of overlap and, as a result, higher performance in emulated legacy system instruction processing.

Reference may be taken to co-pending U.S. application Ser. No. 11/174,866 entitled "Lookahead Instruction Fetch Process for Improved Emulated Instruction Performance" by Russell W. Guenthner et al, filed Jun. 6, 2005, and assigned to the same Assignee as the present application for a more complete exposition of the advantages of selecting a host processor having the characteristics of the Intel Itanium series processors for emulating legacy software.

It is sometimes desirable, or even necessary, to update and enhance the capabilities and expand the operation of the legacy software as it is emulated in an environment which is subject to change. For example, an end user may add to or update the environment within which the emulated legacy software is employed by new application programs or program elements. This can, of course, be achieved by using the software development system which has always been used to bring to fruition the legacy software. However, as pointed out above, the legacy software word size is typically smaller than the word size of the host system (and thus inherently less powerful and versatile); in the specific environment discussed in the example, a 64-bit Intel Itanium series processor is used to emulate the Bull HN DPS 9000 36-bit memory space and the 36-bit based GCOS 8 instruction set of the DPS 9000.

OBJECTS OF THE INVENTION

Accordingly, it would be highly desirable to provide the facility to add new application program elements which are compatible with the target system legacy software, but which take advantage of the more powerful host Central Processing Unit with its larger word size. It is to this end that the present invention is directed.

SUMMARY OF THE INVENTION

As manufacturers of very fast and powerful commodity processors continue to improve the capabilities of their products, it has become practical to emulate the proprietary hardware and operating systems of powerful older computers on platforms built using commodity processors such that the manufacturers of the older computers can provide new systems which allow their customers to continue to use their highly-regarded proprietary legacy software on state-of-the-art new computer systems by emulating the older computer in software that runs on the new systems. In an illustrated embodiment of the subject invention, a 64-bit Cobol Virtual Machine instruction set has been developed to provide the capability of adding to or improving the performance of legacy 36-bit code, much, in the example, having been written in Cobol source code. Cobol-based legacy code can be selectively diverted, in the host CPU (e.g., Intel Itanium 2), to a 64 bit Cobol Virtual Machine Implementation which may include a user input feature. The output legacy and new Cobol source code is compiled in a dedicated 64-bit implementation of the original 36-bit Cobol compiler running on the host processor, and the output of the special purpose compiler is emulated in a special purpose software emulator, separate from the main software emulator that handles the normal 36-bit stream of legacy code, for providing a host system instruction stream for the 64-bit Cobol-based code. Thus, both speed and flexibility in emulating legacy, modified legacy and new Cobol code is achieved. It will be understood by those skilled in the art that legacy code written in other high level languages (e.g., Fortran, Pascal, etc.) can be similarly treated.

The 64-bit instructions and data which are the output of the special purpose compiler, and emulated by the special purpose software emulator, can be mixed with the legacy 36-bit instructions and data. Instructions which are 64-bits can be defined to work on either 36 or 64-bit data. Also, instructions which are both 36 and 64-bit can be mixed in the output from the special purpose compiler so that at execution time the software emulator will switch between the two environments and process both sets of instructions; i.e., both 64 and 36-bit. Distinguishing between 64 and 36-bit instructions can be accomplished by either a mode switch effected by either 36 or 64-bit instructions, or perhaps more efficiently by utilizing the unused bits of the 64-bit word when a 36-bit instruction is in place and to indicate by convention that when those bits are zero that this indicates a 36-bit instruction, and when these bits are non-zero that a 64-bit instruction is in place. Other schemes for achieving this distinction between 36-bit and 64-bit instructions may be devised by those skilled in the art.

BRIEF DESCRIPTION OF THE SEVERAL VIEWS OF THE DRAWING(S)

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

Figure 5:
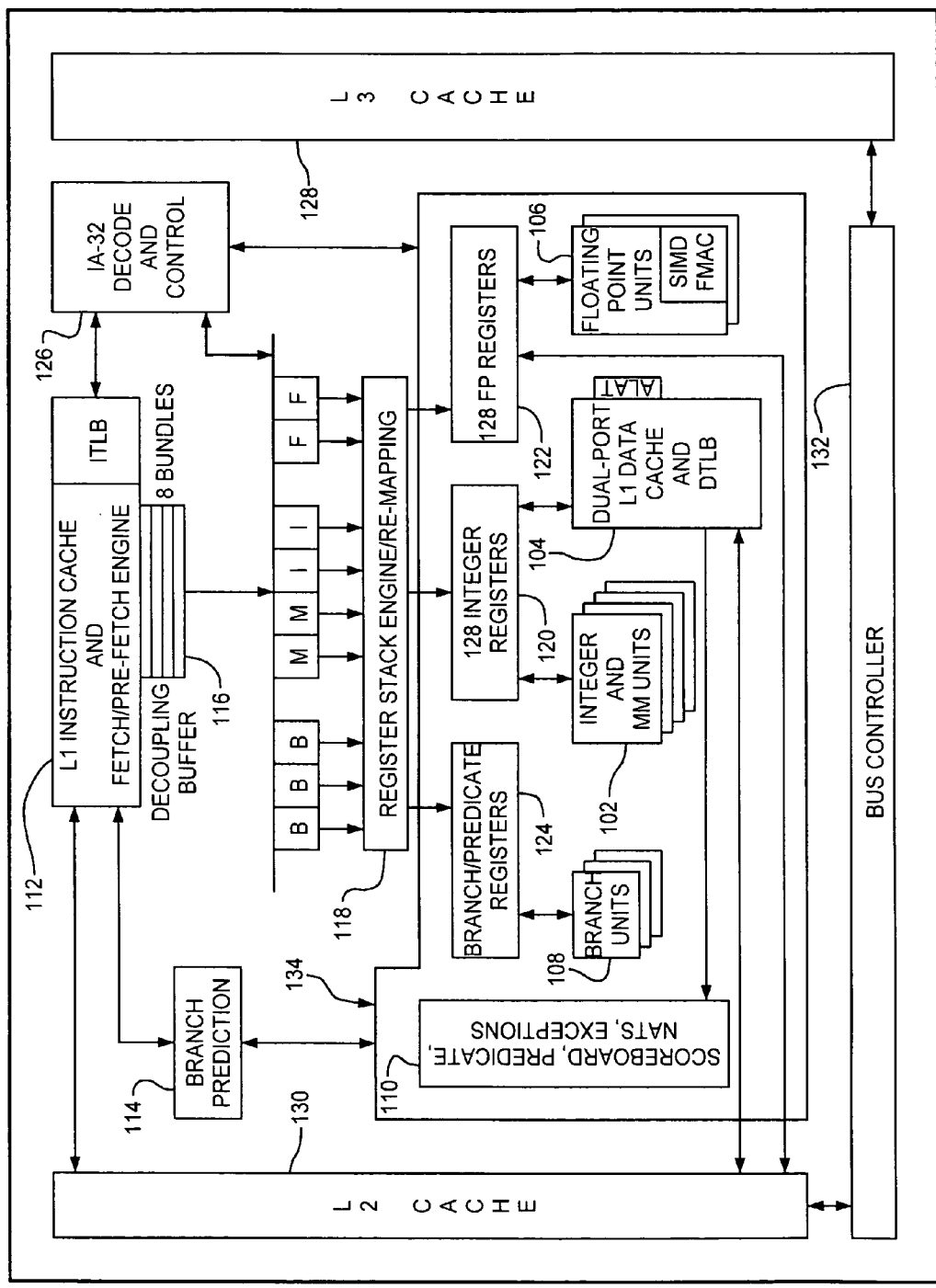
Figure 6:
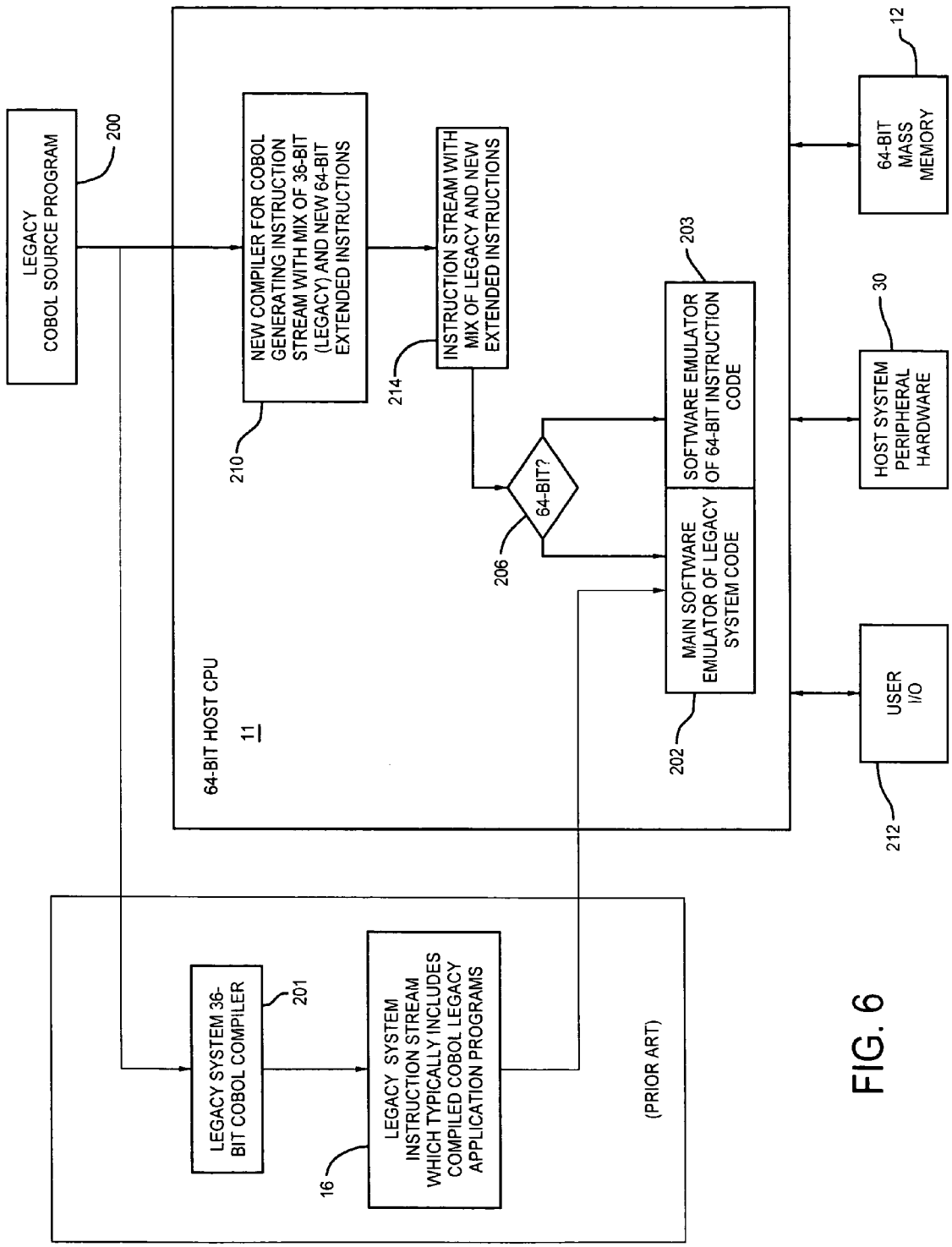

FIG. 5 is block diagram of a host system processor which is well adapted for use in practicing the present invention; and FIG. 6 is a different, process flow oriented, presentation of a host system block diagram incorporating an exemplary improvement according to the present invention whereby Cobol legacy application programs may be added to or supplemented in a virtual machine component using the larger word size of the host processor such that a user may, in effect, extend the capabilities of the legacy software in a manner that results in faster and more versatile operation.

DETAILED DESCRIPTION OF THE PREFERRED EMBODIMENT(S) OF THE INVENTION

Figure 1:
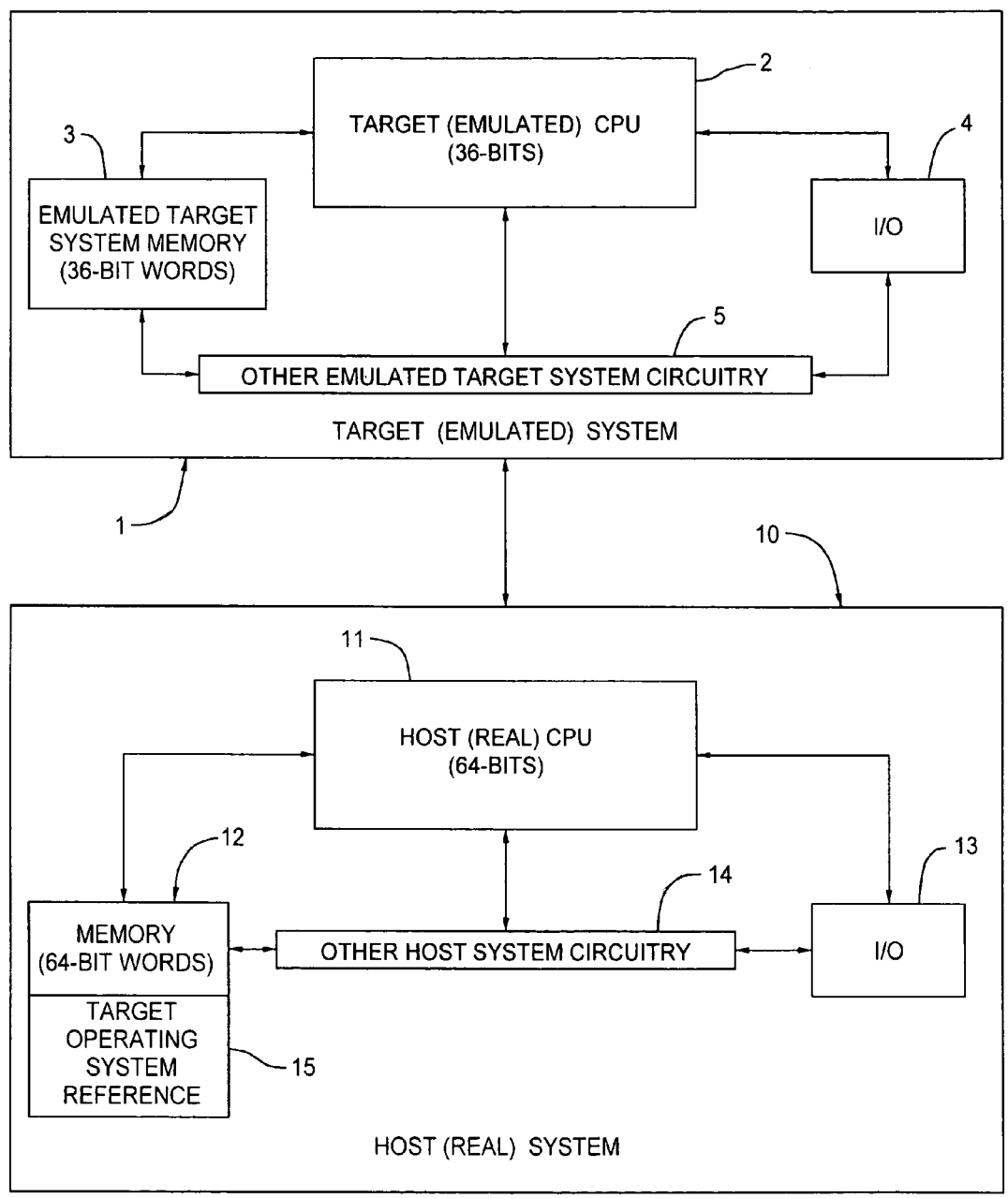
FIG. 1 is a high level block diagram showing a "host" system emulating the operation of a legacy system, which does not physically exist, running legacy software.

FIG. 1 illustrates an exemplary environment in which the invention finds application. More particularly, the operation of a target (emulated) "legacy" system is emulated on a host (real) system 10. The target system 1 includes an emulated central processing unit (CPU) 2 (which may employ multiple processors), an emulated memory 3, emulated input/output (I/O) 4 and other emulated system circuitry 5. The host (real) system 10 includes a host CPU 11, a host memory 12, host I/O 13 and other host system circuitry 14. The host memory 12 contains a dedicated target operating system reference space 15 in which the elements and components of the emulated system 1 are represented.

The target operating system reference space 15 also contains suitable information about the interconnection and interoperation among the various target system elements and components and a complete implementation in software of the target system operating system commands which includes information on the steps the host system must take to "execute" each target system instruction in a program originally prepared to run on a physical machine using the target system operating system. It can be loosely considered that, to the extent that the target system 1 can be said to "exist" at all, it is in the target operating system reference space 15 of the host system memory 12. Thus, an emulator program running on the host system 2 can replicate all the operations of a legacy application program written in the target system operating system as if the legacy application program were running on a physical target system.

In a current state-of-the-art example chosen to illustrate the invention, a 64-bit Intel Itanium series processor is used to emulate the Bull DPS 9000 36-bit memory space and the instruction set of the DPS 9000 with its proprietary GCOS 8 operating system. Within the memory space of the emulator, the 36-bit word of the DPS 9000 is stored right justified in the least significant 36 bits of the "host" (Itanium) 64-bit word during the emulation process. The upper 28 bits of the 64-bit word are typically zero; however, sometimes, certain specific bits in the "upper" 28 bits of the "containing" word are used as flags or for other temporary purposes. In any case, the upper 28 bits of the containing word are always viewed by the "emulated" view of the world as being non-existent. That is, only the emulation program itself uses these bits or else they are left as all zeroes. Leaving the bits as all zeroes can also be a signal to the software emulator that it is "emulating" a 36-bit instruction, and the non-zero indication would signal a 64-bit instruction.

Figure 2A:
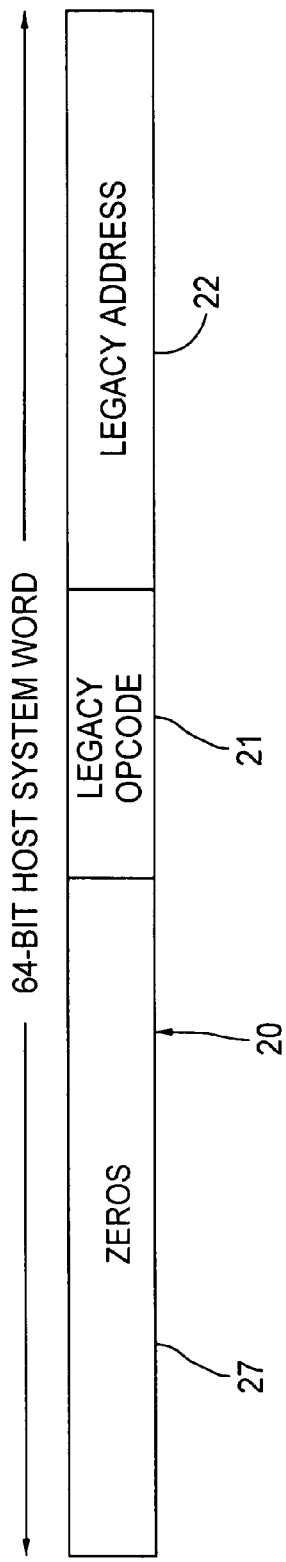
FIG. 2 shows the format of an exemplary simple legacy code instruction which is emulated by emulation software on the host system and also the format of the newly defined 64-bit instruction.

FIG. 2A shows, in a 64-bit host system word 20, the format of a simple 36-bit legacy code instruction word which includes an opcode field 21 and an address or operand field 22 and unused bits which are zeroes 27. Those skilled in the art will appreciate that an instruction word can contain several fields which may vary according to the class of instruction word, but it is the field commonly called the "opcode" which is of particular interest in explaining the present invention. The opcode of the legacy instruction is that which controls the program flow of the legacy program being executed. As a direct consequence the instruction word opcode of each sequential or subsequent legacy instruction controls and determines the overall program flow of the host system emulation program and the program address of the host system code to process each legacy instruction. Thus, the legacy instruction word opcode and the examination and branching of the host system central processor based on the opcode is an important and often limiting factor in determining the overall performance of the emulator. The decision making to transfer program control to the proper host system code for handling each opcode type is unpredictable and dependent on the legacy system program being processed. The order of occurrence and the branching to handle any possible order of instruction opcodes is unpredictable and will often defeat any branch prediction mechanism in the host system central processor which is trying to predict program flow of the emulation program.

Figure 2B:
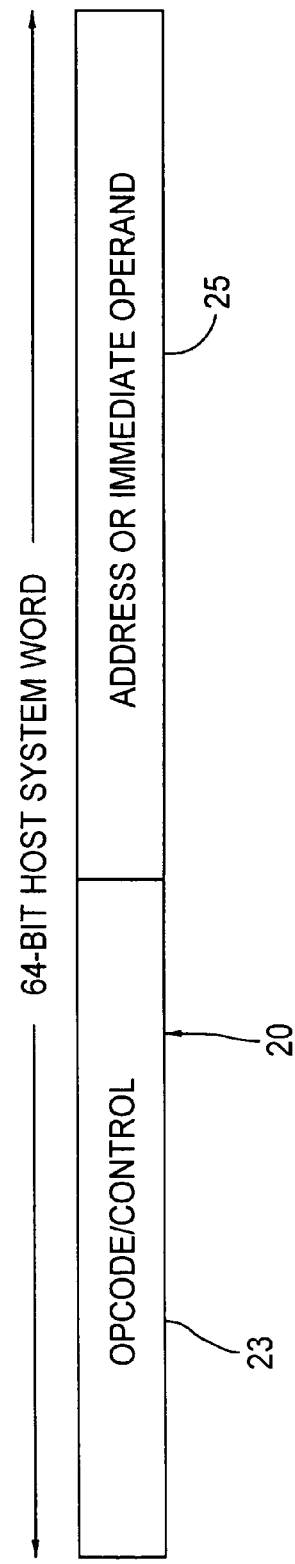

FIG. 2B shows a format for a 64-bit instruction contained within the same 64-bit host system word 20 but with the entire 64-bit word utilized such that the opcode for the 64-bit instruction 23 is in the unused space 27 for the legacy instruction, and the address field 25 of the 64-bit instruction is contained within the 36-bits of the instruction word previously utilized by the entire 36-bit legacy instruction.

Figure 3:
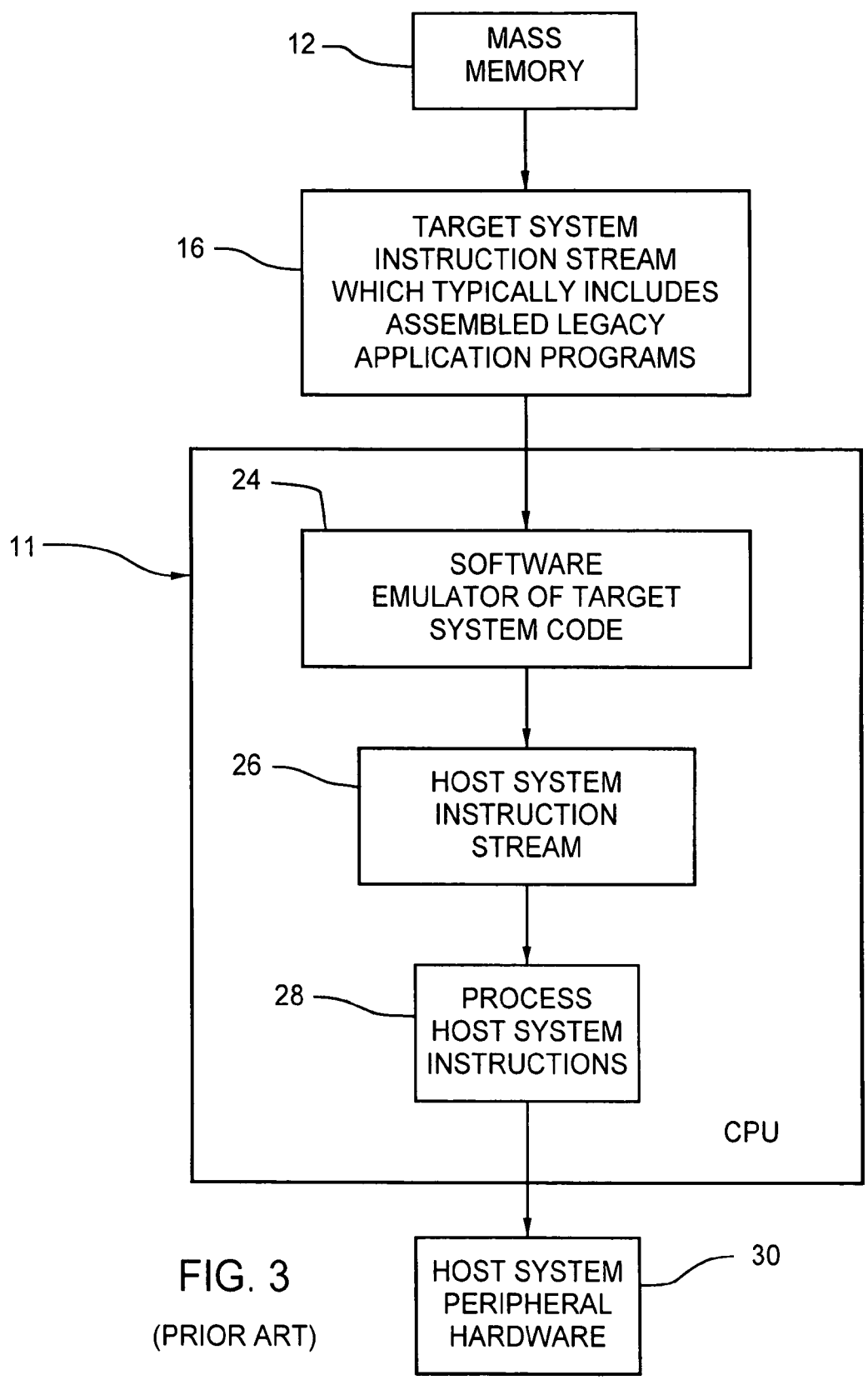
FIG. 3 is a high level flowchart showing the prior art approach to emulating legacy code.

FIG. 3 is a simplified flow chart showing the basic, linear, prior art approach to emulating legacy software in a host system. Legacy software stored in the host mass memory 12, typically including application programs assembled in the target system instruction set 16, is streamed to the host processor 11, an Intel Itanium 2 in the current example. In the processor 11, the legacy software code stream is converted to a host system code stream 26 by a software emulator 24. The host system instruction stream is processed 28 to direct the host system peripheral hardware 30 to perform the same operations as was carried out in the past in the same environment as the legacy system running on an older target hardware system.

Figure 4:
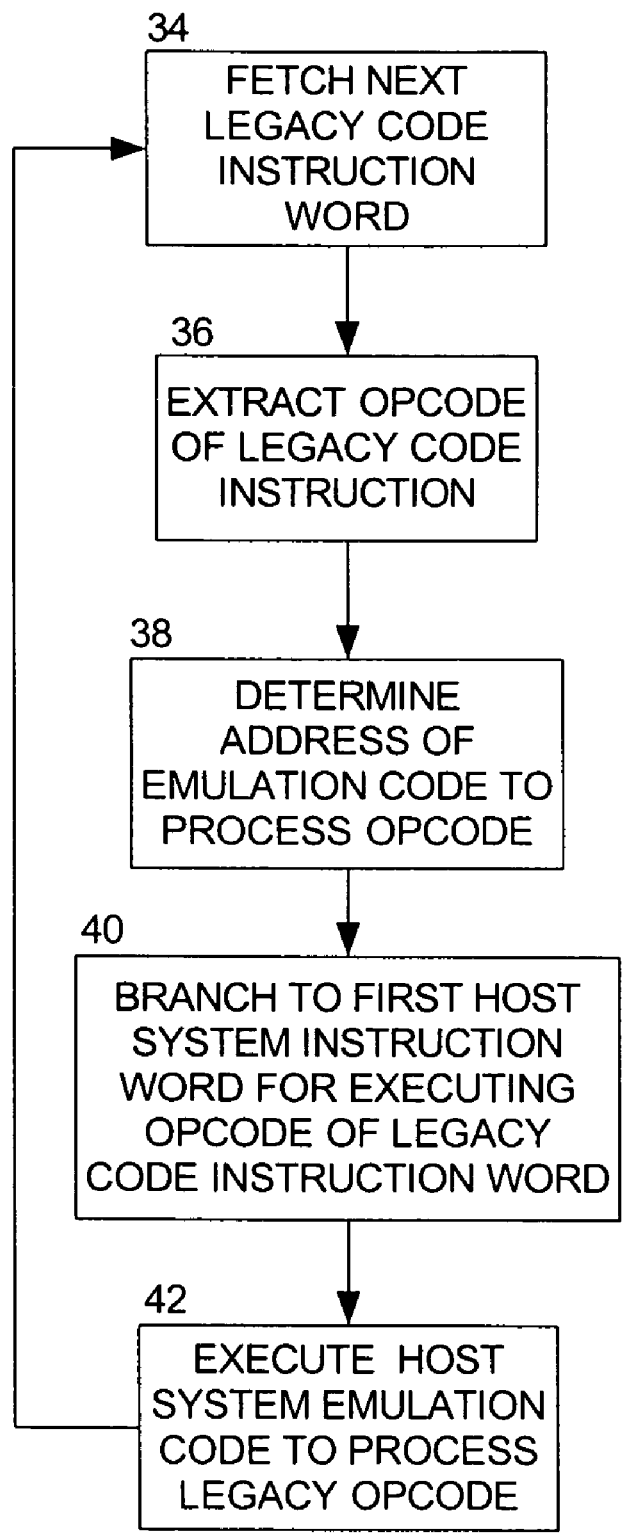
FIG. 4 is a high level flowchart showing the general operation in a host processor emulating legacy code.

FIG. 4 is a simplified process flow chart showing the prior art operation within a host processor during the linear emulation of legacy software. At step 34, the next legacy instruction word is fetched in an ongoing emulation process. At step 36, the opcode of the legacy instruction is extracted. At step 38, the memory address of the first instruction in the emulation code routine which is to be executed by the host system to emulate the legacy code instruction word is determined. At step 40, there is a branch to the first instruction word of the relevant emulation code; then, at step 42, the emulation code routine is executed, and only after this step is the next instruction word of the legacy code fetched at step 34.

The subject invention can be practiced in host CPUs of any design but is particularly effective in those which include branch prediction registers which assist the hardware in handling branches and also benefits from CPUs employing parallel execution units and having efficient parallel processing capabilities. It has been found, at the state-of-the-art, that the Intel Itanium series of processors is an excellent exemplary choice for practicing the invention. Accordingly, attention is directed to FIG. 5 which is a block diagram of an Intel Itanium processor which will be used to describe the present invention.

The CPU 100 employs Explicitly Parallel Instruction Computing (EPIC) architecture to expose Instruction Level Parallelism (ILP) to the hardware. The CPU 100 provides a six-wide and ten-stage pipeline to efficiently realize ILP.

The function of the CPU is divided into five groups. The immediately following discussion gives a high level description of the operation of each group.

Instruction Processing: The instruction processing group contains the logic for instruction prefetch and fetch 112, branch prediction 114, decoupling coupler 116 and register stack engine/remapping 118.

Execution: The execution group 134 contains the logic for integer, floating point, multimedia, branch execution and the integer and floating point register files. More particularly, the hardware resources include four integer units/four multimedia units 102, two load/store units 104, two extended precision floating point units and two single precision floating point units 106 and three branch units 108 as well as integer registers 120, FP registers 122 and branch and Predicate registers 124. In certain versions of the Itanium 2 architecture, six of the execution units can be utilized by the CPU simultaneously with the possibility of six instructions being started in one clock cycle, and sent down the execution pipeline. Six instructions can also be completed simultaneously.

Control: The control group 110 includes the exception handler and pipeline control. The processor pipeline is organized into a ten stage core pipeline that can execute up to six instructions in parallel each clock period.

IA-32 Execution: The IA-32 instruction group 126 group contains hardware for handling certain IA-32 instructions; i.e., 32-bit word instructions which are employed in the Intel Pentium series processors and their predecessors, sometimes in 16-bit words.

Three levels of integrated cache memory minimize overall memory latency. This includes an L3 cache 128 coupled to an L2 cache 130 under directive from a bus controller 130. Acting in conjunction with sophisticated branch prediction and correction hardware, the CPU speculatively fetches instructions from the L1 instruction cache in block 112. Software-initiated prefetch probes for future misses in the instruction cache and then prefetches specified code from the L2 cache into the L1 cache. Bus controller 132 directs the information transfers among the memory components.

The foregoing will provide understanding by one skilled in the art of the environment, provided by the Intel Itanium series CPU, in which the present invention may be practiced. The architecture and operation of the Intel Itanium CPU processors is described in much greater detail in the Intel publication "Intel® Itanium™ 2 Processor Hardware Developer's Manual" which may be freely downloaded from the Intel website and which is incorporated by reference herein.

The Itanium 2 is presently preferred as the environment for practicing the present invention, but, of course, future versions of the Itanium series processors, or other processors which have the requisite features, may later be found to be still more preferred.

Referring now to FIG. 6, an exemplary embodiment of the present invention is shown incorporated into the exemplary host system in a process flow schematic. As previously mentioned, legacy software stored in the 64-bit host mass memory 12, typically including application programs assembled in the target system 36-bit-based instruction set 16, previously compiled by the legacy system compiler 201, is streamed to the host processor 11, an Intel Itanium 2 in the current example. Emulator 202 is the main software emulator of the legacy system code and coupled to it is emulator 203 which is the software emulation of the newly defined 64-bit instruction set. The output of the special compiler 214 provides a mixture of 36-bit legacy and new 64-bit instructions which are loaded as the Cobol program instruction stream 204. At switch 206, a determination is made as to whether the current instruction is a legacy instruction or a new 64-bit instruction using the criteria previously discussed or any other suitable criteria. If the instruction is a legacy instruction, it is processed by the main emulation software code 202. If the instruction is a 64-bit instruction it is processed by the coupled software emulator of the 64-bit instruction code. Those skilled in that art will appreciate that the software emulators 202, 203 can be closely integrated.

The 64-bit Cobol Virtual Machine Implementation 210 may incorporate new instructions and may be provided with user input 212 (e.g., a keyboard and terminal or terminal emulator). The 64-bit Cobol Virtual Machine Implementation 210 may be based on existing Cobol Virtual Machine Implementations or newly-developed. It needs only to generate conventional 36-bit machine code supplemented by new 64-bit emulated machine commands as might be found useful in emulating the legacy Cobol-based code. A suitable compiler 214 is therefore provided to convert the 64-bit Cobol source code to a mixed 36/64-bit version of the target system instruction set. The compiler 214 itself may be congruent with the original 36-bit compiler developed for the GCOS 8 instruction set. The input to the compiler 210 is from the legacy source code 200. Accordingly, the host system peripheral equipment is directed by the host system instructions generated by the emulators 202, 203 to cause the peripheral equipment to perform operations previously performed by the target system running the legacy software with improved speed and efficiency.

Although the example illustrates the application of the invention to provide a Cobol legacy code enhancement, other well-known languages, such as Fortran, Pascal, Assembly, etc. can be similarly treated either singularly or in combination as may be useful and suitable in a given target/host combination.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. Apparatus for emulating hardware and operations of a first, target, computer system having legacy system and legacy application program software source code compiled to produce executable legacy binary code which includes legacy code instructions in a word size of a first length, the apparatus comprising:
   A) a host computer system having a word size of a second length which is larger than the word size of the first length, said host computer system including:
      1) a host central processing unit;
      2) a memory storing said legacy code instructions and streaming said legacy code instructions to said central processing unit;
      3) peripheral equipment operatively coupled to said host central processing unit and to said memory, said peripheral equipment performing operations previously performed by the target system running the legacy application software; and,
      4) a special purpose software emulator including:
         a) a first legacy software emulator running on said host central processing unit and emulating said legacy code instructions which, when processed, causes said peripheral equipment to perform operations previously performed by the target system running the legacy application software; and,
         b) a second software emulator running on said host central processing unit and emulating instructions with a word size of the second length;
   B) a compiler receiving the legacy application program software source code and generating an enhanced executable program file which is stored on the peripheral equipment for loading into the memory of the host computer system, the enhanced executable program file including instructions having the word size of the second length and optionally including instructions having the word size of the first length; and
   C) a switch mechanism, included within the special purpose software emulator, selectively based upon the word length directing processing of instructions at run time from the enhanced executable program file loaded in memory to either:
      1) the first legacy software emulator running on said host central processing unit processing instructions having the word size of the first length; or
      2) the second software emulator running on said host central processing unit processing instructions having the word size of the second length.

2. The apparatus of claim 1 in which said compiler generating the enhanced executable program file which includes instructions in the word size of a the second length includes a user input selectively adding to and modifying legacy code directed thereto.

3. The apparatus of claim 1 in which said switch mechanism is operable only with respect to legacy code that is based on a predetermined high level programming language and in which said compiler generates code in the word size of the second length and is also based on said predetermined high level programming language.

4. The apparatus of claim 2 in which said switch mechanism is operable only in conjunction with legacy code that is based on a predetermined high level programming language and in which said compiler generates source code in the word size of the second length and is also based on said predetermined high level programming language.

5. The apparatus of claim 1 in which said compiler generating source code in the word size of a second length is a Cobol compiler that compiles legacy application program software source code written in the Cobol programming language.

6. The apparatus of claim 2 in which said compiler generating source code in the word size of a second length is a Cobol compiler that compiles legacy application program software source code written in the Cobol programming language.

7. The apparatus of claim 3 in which said compiler generating source code in the word size of a second length is a Cobol compiler that compiles legacy application program software source code written in the Cobol programming language.

8. The apparatus of claim 4 in which said compiler generating source code in the word size of a second length is a Cobol compiler that compiles legacy application program software source code written in the Cobol programming language.

9. The apparatus of claim 1 in which said first word length is 36 bits and said second word length is at least 64 bits.

10. The apparatus of claim 2 in which said first word length is 36 bits and said second word length is at least 64 bits.

11. The apparatus of claim 3 in which said first word length is 36 bits and said second word length is at least 64 bits.

12. The apparatus of claim 4 in which said first word length is 36 bits and said second word length is at least 64 bits.

13. The apparatus of claim 5 in which said first word length is 36 bits and said second word length is at least 64 bits.

14. The apparatus of claim 6 in which said first word length is 36 bits and said second word length is at least 64 bits.

15. The apparatus of claim 7 in which said first word length is 36 bits and said second word length is at least 64 bits.

16. The apparatus of claim 8 in which said first word length is 36 bits and said second word length is at least 64 bits.

17. A process for emulating the hardware and operations of a first, target, computer system having legacy system and application program software in a word size of a first length on a host computer system having a word size of a second length which is larger than the word size of a first length, the host computer system including a host central processing unit and peripheral equipment for performing operations previously performed by the target system running the legacy software; said process including:
   A) compiling legacy application software source code to generate an instruction stream including instructions of word size greater than the first length with data size of the first length and optionally including instructions having the word size of the first length; and,
   B) selectively based upon the word length directing processing of instructions from the emulated instruction stream to either:
      1) a first legacy software emulator running on the host central processing unit processing the instructions of word size of the first length, causing the host system peripheral equipment to perform operations previously performed by the target system running the legacy software; or
      2) a second software emulator running on the host central processing unit, processing instructions in the word size greater than the first length.

18. The process of claim 17 in which step B) is performed only with respect to legacy code generated based on a predetermined high level programming language and in which step A) is also based on application software source code written in the predetermined high level programming language.

19. The process of claim 18 in which the high level programming language is Cobol.

20. The apparatus of claim 1 in which said first and second software emulators are closely integrated with the first and second software emulators both being simultaneously present in the memory of the host system.

21. A method of constructing a host system that emulates legacy application code instructions written for execution on a target computer system having a word size of a first length by a host computer system having a word size of a second length which is larger than the word size of a first length, said host computer system including a host central processing unit; a memory storing said legacy code instructions and streaming said legacy code instructions to said central processing unit; and, peripheral equipment operatively coupled to said host central processing unit and to said memory, said peripheral equipment for performing operations previously performed by the target system running the legacy application software, said method comprising the steps of:
   A) adding/including within the host computer system, a special purpose software emulator including:
      1) a first legacy software emulator running on said central processing unit of said host system and emulating said legacy code instructions which, when processed, causes said peripheral equipment to perform operations previously performed by the target system running the legacy application software instructions; and,
      2) a second software emulator running on said host central processing unit and emulating instructions having a word size of the second length;
   B) adding/including within the host computer system, a compiler operatively coupled to receive legacy application program software source code from host peripheral equipment and generating an executable program file which is stored on the peripheral equipment for loading into the memory of the host computer system, the executable program file including instructions having the word size larger than the first length and optionally including instructions having the word size of the first length; and
   C) including within the special purpose software emulator, a switch mechanism for selectively directing instructions at run time from the executable program file loaded in memory to either:
      1) the first legacy software emulator running on said host central processing unit processing instructions having the word size of the first length; or
      2) the second software emulator running on said host central processing unit processing instructions having the word size of the second length.

* * * * *